US011945216B2

(12) United States Patent
Ukawa et al.

(10) Patent No.: US 11,945,216 B2
(45) Date of Patent: Apr. 2, 2024

(54) TRANSPORT DEVICE, FIXING DEVICE, AND IMAGE FORMING APPARATUS

(71) Applicant: FUJIFILM Business Innovation Corp., Tokyo (JP)

(72) Inventors: Takayuki Ukawa, Kanagawa (JP); Kei Tanaka, Kanagawa (JP); Hideki Kuge, Kanagawa (JP); Norio Ogawahara, Kanagawa (JP); Takayuki Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 221 days.

(21) Appl. No.: 17/561,086

(22) Filed: Dec. 23, 2021

(65) Prior Publication Data

US 2023/0067911 A1 Mar. 2, 2023

(30) Foreign Application Priority Data

Aug. 25, 2021 (JP) ................................ 2021-137621

(51) Int. Cl.

| | |
|---|---|
| ***B41J 13/00*** | (2006.01) |
| ***B41J 13/02*** | (2006.01) |
| ***B65H 5/06*** | (2006.01) |
| ***B65H 5/08*** | (2006.01) |
| ***G03G 15/00*** | (2006.01) |
| ***G03G 15/16*** | (2006.01) |
| ***G03G 15/20*** | (2006.01) |

(52) U.S. Cl.

CPC ............ *B41J 13/025* (2013.01); *B65H 5/062* (2013.01); *B65H 5/085* (2013.01); *G03G 15/167* (2013.01); *G03G 15/2028* (2013.01)

(58) Field of Classification Search

CPC ............... G03G 15/167; G03G 15/2028; B41J 11/0024; B41J 13/025; B41J 2002/012; B65H 5/062; B65H 5/085; B65H 2404/1441; B65H 2404/341; B65H 2404/343; B65H 2801/03; B65H 2801/21

See application file for complete search history.

(56) References Cited

U.S. PATENT DOCUMENTS

| | | | | |
|---|---|---|---|---|
| 11,385,577 B2 * | 7/2022 | Kodera | .............. | G03G 15/2028 |
| 2006/0056886 A1 * | 3/2006 | Ohishi | .................. | B41J 13/025 399/328 |
| 2022/0097426 A1 * | 3/2022 | Baba | ...................... | B65H 5/062 |

FOREIGN PATENT DOCUMENTS

| | | |
|---|---|---|
| JP | 2006-259223 A | 9/2006 |

* cited by examiner

*Primary Examiner* — Sophia S Chen
(74) *Attorney, Agent, or Firm* — Oliff PLC

(57) ABSTRACT

A transport device includes: a first rotating body including a shaft portion, a cylindrical portion on an outer periphery of the shaft portion, and a recessed portion in an outer surface of the cylindrical portion; a second rotating body capable of moving from the first rotating body while contacting an outer surface of the first rotating body and nipping a recording medium; a transport unit that includes a holding portion that holds the recording medium, and that transports the recording medium by moving the holding portion in a rotation direction of the first rotating body while the holding portion is disposed in the recessed portion; and a moving mechanism including a cam portion on a side of the cylindrical portion and a contact portion connected to the second rotating body and that comes into contact with the cam portion to separate the second rotating body from the first rotating body.

12 Claims, 11 Drawing Sheets

TRANSPORT DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2021-137621 filed Aug. 25, 2021.

BACKGROUND

(i) Technical Field

The present disclosure relates to a transport device, a fixing device, and an image forming apparatus.

(ii) Related Art

Japanese Unexamined Patent Application Publication No. 2006-259223 discloses a fixing device including a pair of fixing rollers that are a first fixing roller and a second fixing roller arranged in a pair, at least one of the fixing rollers serving as a heating roller and at least one of the fixing rollers having a replaceable surface layer; adhesion means including an adhesion member; charging means that charges at least one of a recording medium and the adhesion means; and fixing means that physically fixes a leading end portion of the recording medium in a transporting direction to the adhesion means with a gripping portion. The adhesion member and the recording medium are electrostatically joined together by the charging means, and the recording medium is fixed to the adhesion means by the fixing means. After that, the pair of fixing rollers transport the recording medium while nipping the recording medium therebetween together with the adhesion means, so that an image is fixed to the recording medium.

SUMMARY

A transport device for a recording medium, such as a paper sheet, may include a first rotating body having a recessed portion in an outer surface thereof; a second rotating body that nips the recording medium between the second rotating body and the first rotating body; a transport unit that transports the recording medium by moving a holding portion that holds a front end section of the recording medium while the holding portion is disposed in the recessed portion; and a moving mechanism that separates the second rotating body from the first rotating body at a position of the recessed portion in the first rotating body.

In the above-described structure, when the moving mechanism includes a cam portion provided on a shaft portion of the first rotating body, it is difficult to position the cam portion with respect to the first rotating body.

Aspects of non-limiting embodiments of the present disclosure relate to a structure including a moving mechanism by which a second rotating body that is in contact with a first rotating body is separated from the first rotating body at a position of a recessed portion provided in the first rotating body, the moving mechanism including a cam portion that may be more easily positioned with respect to the first rotating body compared to when the cam portion is provided on a shaft portion of the first rotating body.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a transport device including: a first rotating body including a shaft portion, a cylindrical portion provided on an outer periphery of the shaft portion, and a recessed portion provided in an outer surface of the cylindrical portion; a second rotating body capable of moving toward and away from the first rotating body, the second rotating body rotating while being in contact with an outer surface of the first rotating body and nipping a recording medium between the second rotating body and the first rotating body; a transport unit including a holding portion that holds a front end section of the recording medium, the transport unit transporting the recording medium by moving the holding portion in a rotation direction of the first rotating body while the holding portion is disposed in the recessed portion; and a moving mechanism including a cam portion provided on a side surface of the cylindrical portion and a contact portion that is connected to the second rotating body and that comes into contact with the cam portion to separate the second rotating body from the first rotating body before the second rotating body enters the recessed portion.

BRIEF DESCRIPTION OF THE DRAWINGS

Exemplary embodiments of the present disclosure will be described in detail based on the following figures, wherein.

DETAILED DESCRIPTION

Figure 1:
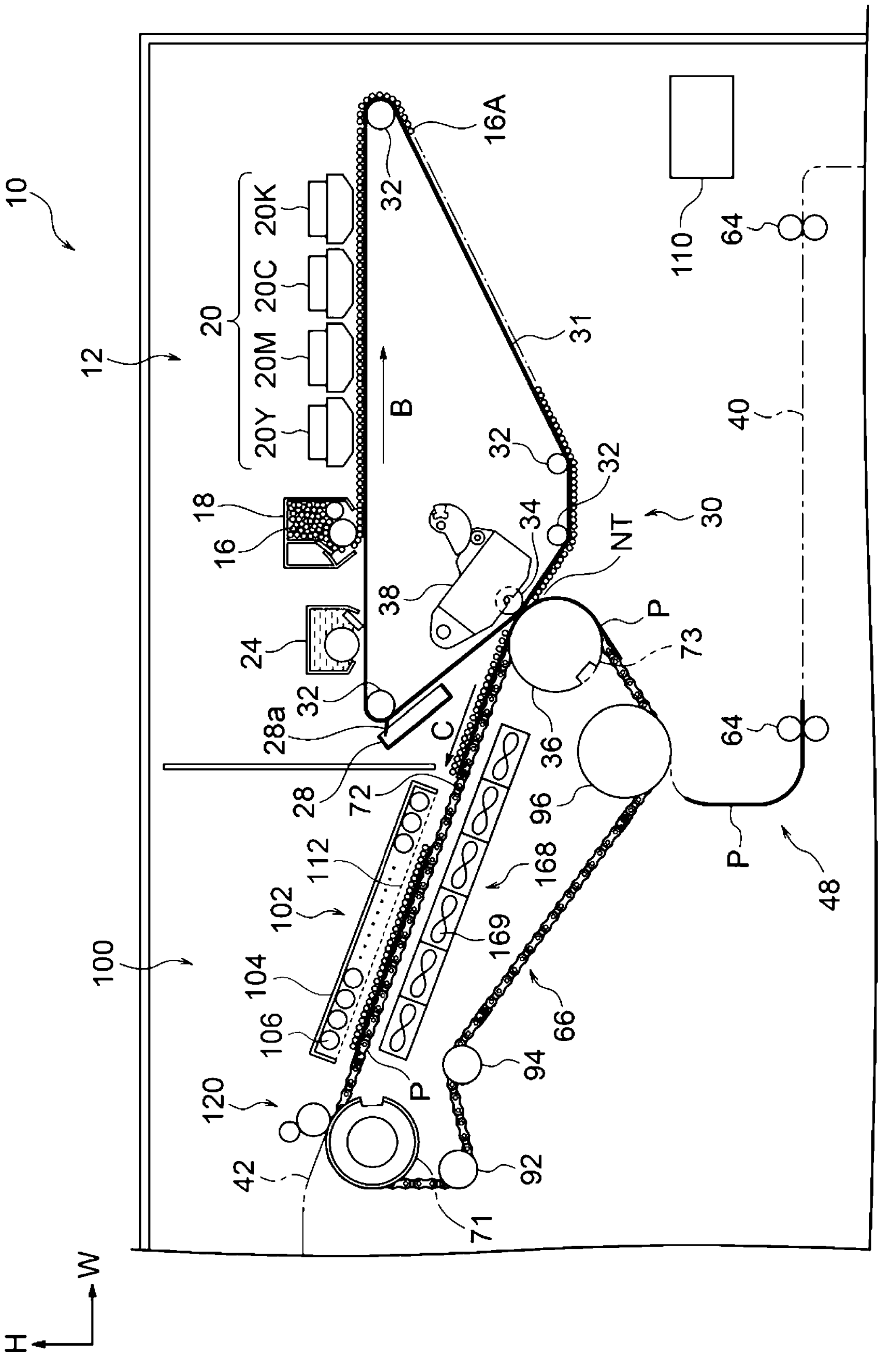
FIG. 1 is a schematic front view of a part of an inkjet image forming apparatus according to an exemplary embodiment of the present disclosure.

A fixing device and an image forming apparatus according to an exemplary embodiment of the present disclosure will now be described with reference to FIGS. 1 to 10. In the drawings, arrow H shows an apparatus up-down direction (vertical direction), arrow W shows an apparatus width direction (horizontal direction), and arrow D shows an apparatus depth direction (horizontal direction).

Image Forming Apparatus 10

Figure 5:
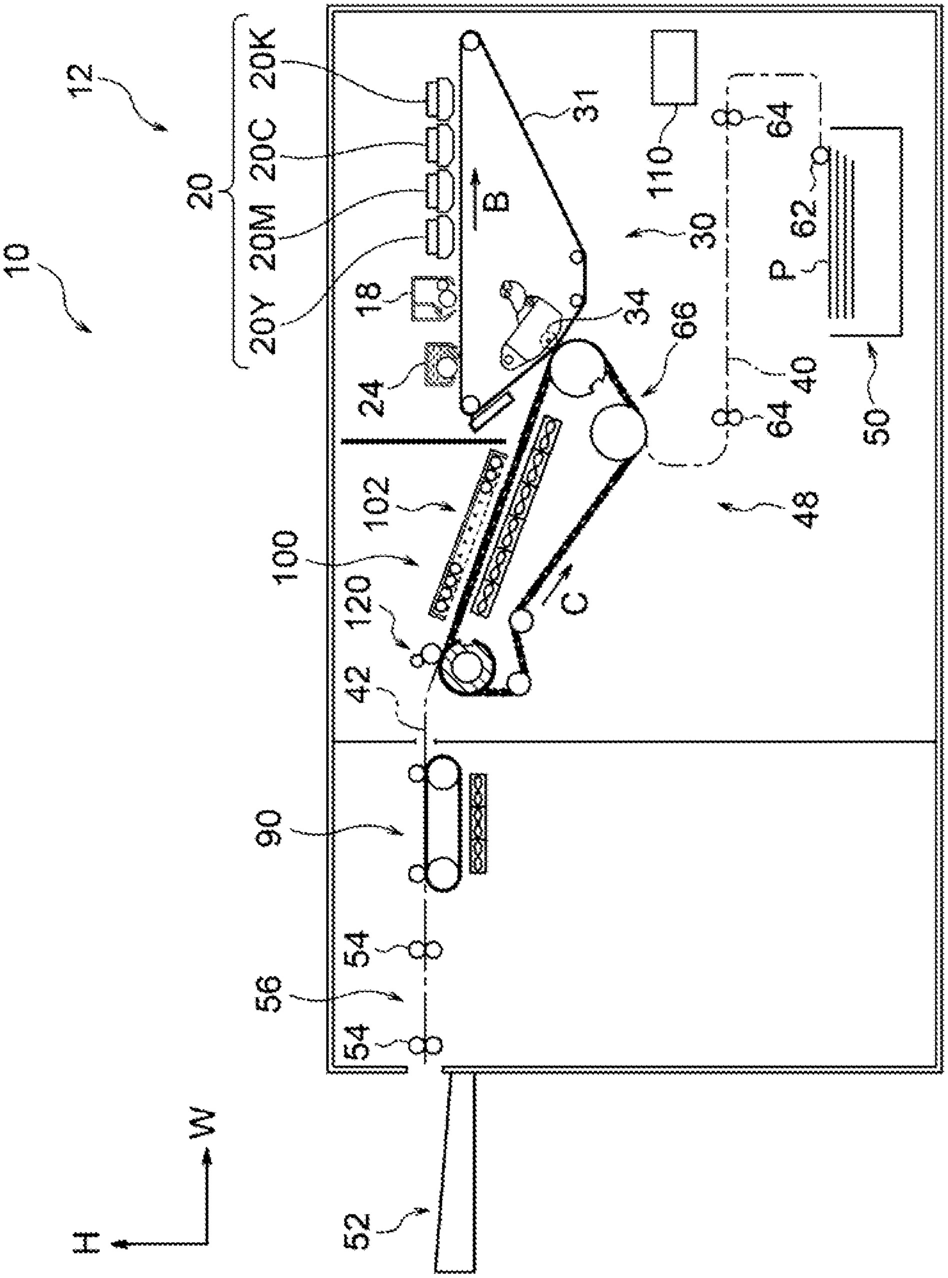
FIG. 5 is a schematic front view illustrating the overall structure of the image forming apparatus according to the exemplary embodiment illustrated in FIG. 1.

The structure of an image forming apparatus 10 according to the present exemplary embodiment will now be described. FIG. 1 is a schematic diagram of a part (an image forming unit 12, a transfer unit 30, and a fixing unit 100) of the image forming apparatus 10 according to the present exemplary embodiment. FIG. 5 is a schematic diagram illustrating the overall structure of the image forming apparatus 10 according to the present exemplary embodiment.

The image forming apparatus 10 according to the present exemplary embodiment is an inkjet image forming apparatus that forms an ink image on a sheet member P based on image information input to the apparatus. The sheet member P is an example of a recording medium, and the ink image is an example of an image. As illustrated in FIG. 5, the image forming apparatus 10 includes a storage unit 50, a paper feed mechanism 48, the image forming unit 12, the transfer unit 30, the fixing unit 100, a cooling unit 90, a paper output mechanism 56, and an output unit 52. The image forming apparatus 10 also includes a control device 110 that controls operations of components by outputting control information based on, for example, the image information input to the apparatus and the results of detection performed by sensors.

The storage unit 50 has a function of storing sheet members P. As illustrated in FIG. 5, the image forming apparatus 10 includes the storage unit 50. The sheet members P are fed from the storage unit 50. The sheet members P may be, for example, sheets of cut paper (so-called cut sheets) having a predetermined size. The present disclosure is not limited to this structure. For example, the image forming apparatus 10 may include plural storage units 50. In such a case, the sheet members P are selectively fed from the storage units 50.

The paper feed mechanism 48 has a function of transporting each of the sheet members P stored in the storage unit 50 to a chain gripper 66 described below. More specifically, as illustrated in FIG. 5, the paper feed mechanism 48 includes a feeding roller 62 and plural transport rollers 64 that transport each sheet member P along a paper supply path 40 for the sheet member P.

As illustrated in FIG. 5, the feeding roller 62 is a roller that feeds each of the sheet members P stored in the storage unit 50 to the paper supply path 40. The transport rollers 64 are rollers that transport the sheet member P fed to the paper supply path 40 by the feeding roller 62 to the chain gripper 66.

Figure 2:
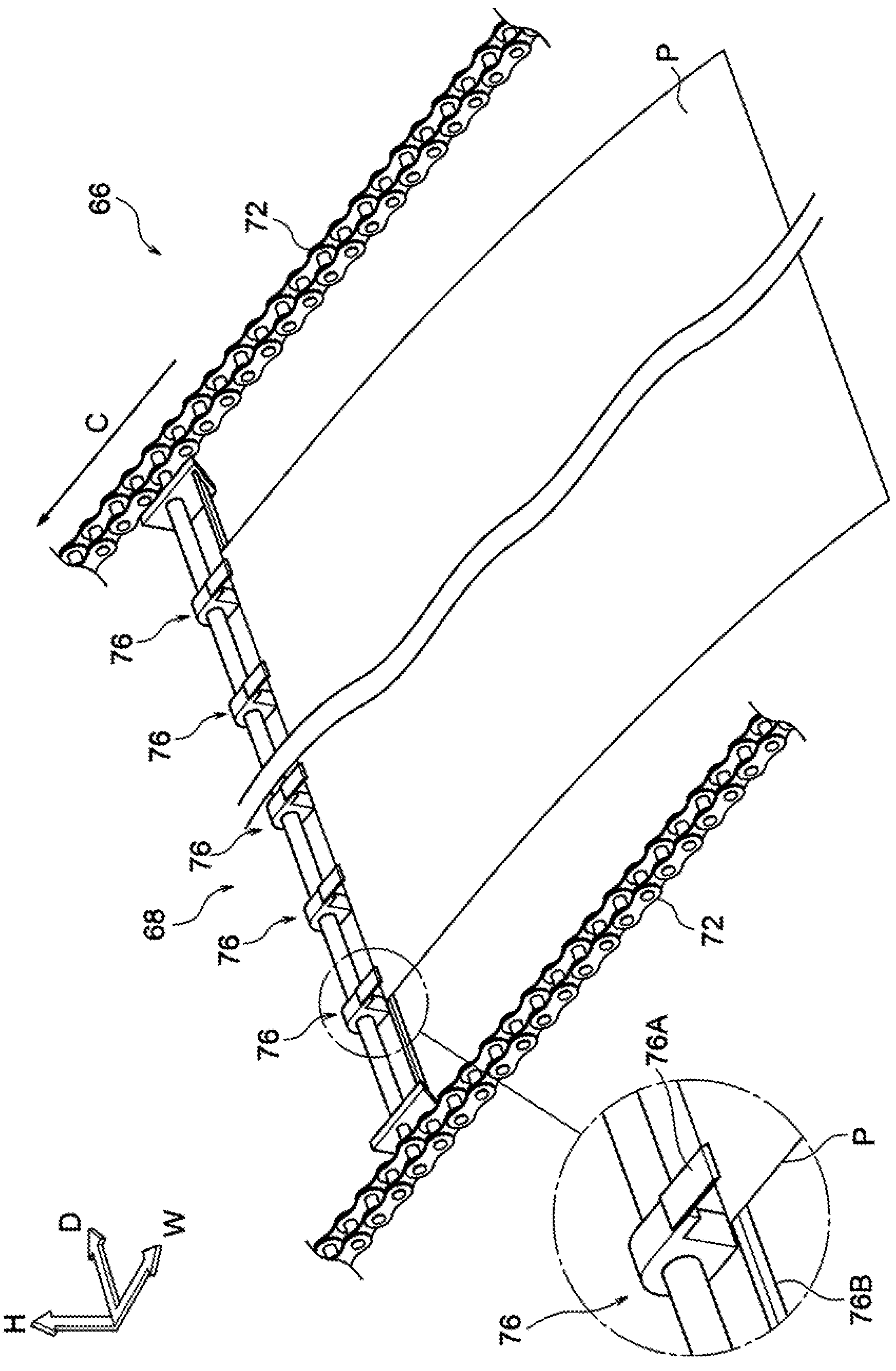
FIG. 2 is a perspective view of a chain gripper according to the exemplary embodiment illustrated in FIG. 1.

The chain gripper 66 has a function of transporting the sheet member P received from the paper feed mechanism 48 to a paper output path 42 through the transfer unit 30 and the fixing unit 100. More specifically, as illustrated in FIG. 2, the chain gripper 66 holds a front end portion of the sheet member P (that is, a downstream end portion in a transporting direction in which the sheet member P is transported) and transports the sheet member P to the paper output path 42 through the transfer unit 30 and the fixing unit 100. The sheet member P transported to the paper output path 42 is further transported to the output unit 52, which is disposed outside an apparatus body, by plural transport rollers 54 included in the paper output mechanism 56. The chain gripper 66 is an example of a transport unit. Referring to FIG. 1, the chain gripper 66 includes a pair of chains 72, pairs of sprockets 71, 73, 92, 94, and 96, and gripping units 68 (see FIG. 2) provided with grippers 76 that grip the leading end of the sheet member P.

Figure 3:
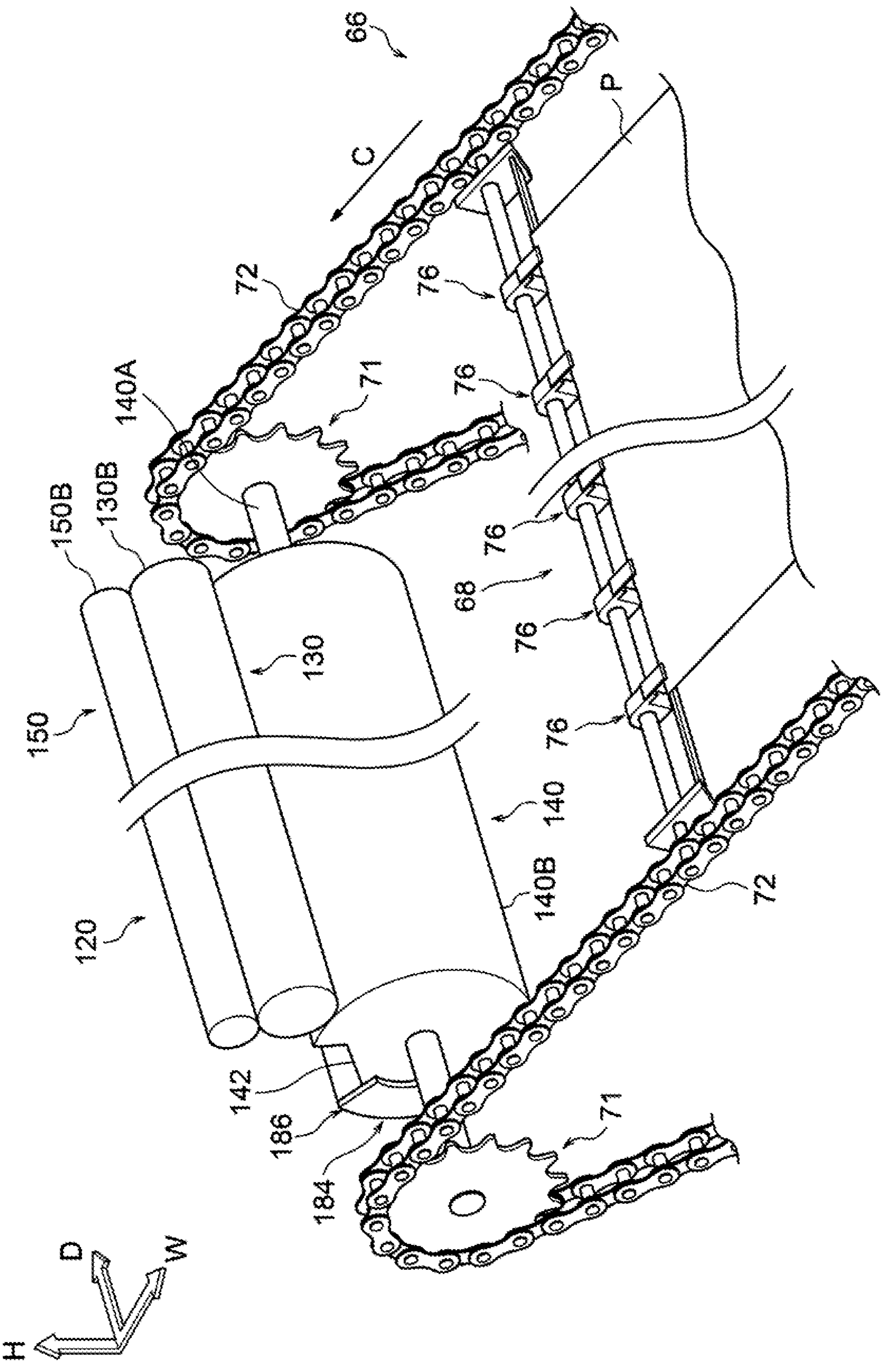
FIG. 3 is a perspective view of a fixing device according to the exemplary embodiment illustrated in FIG. 1.
Figure 4:
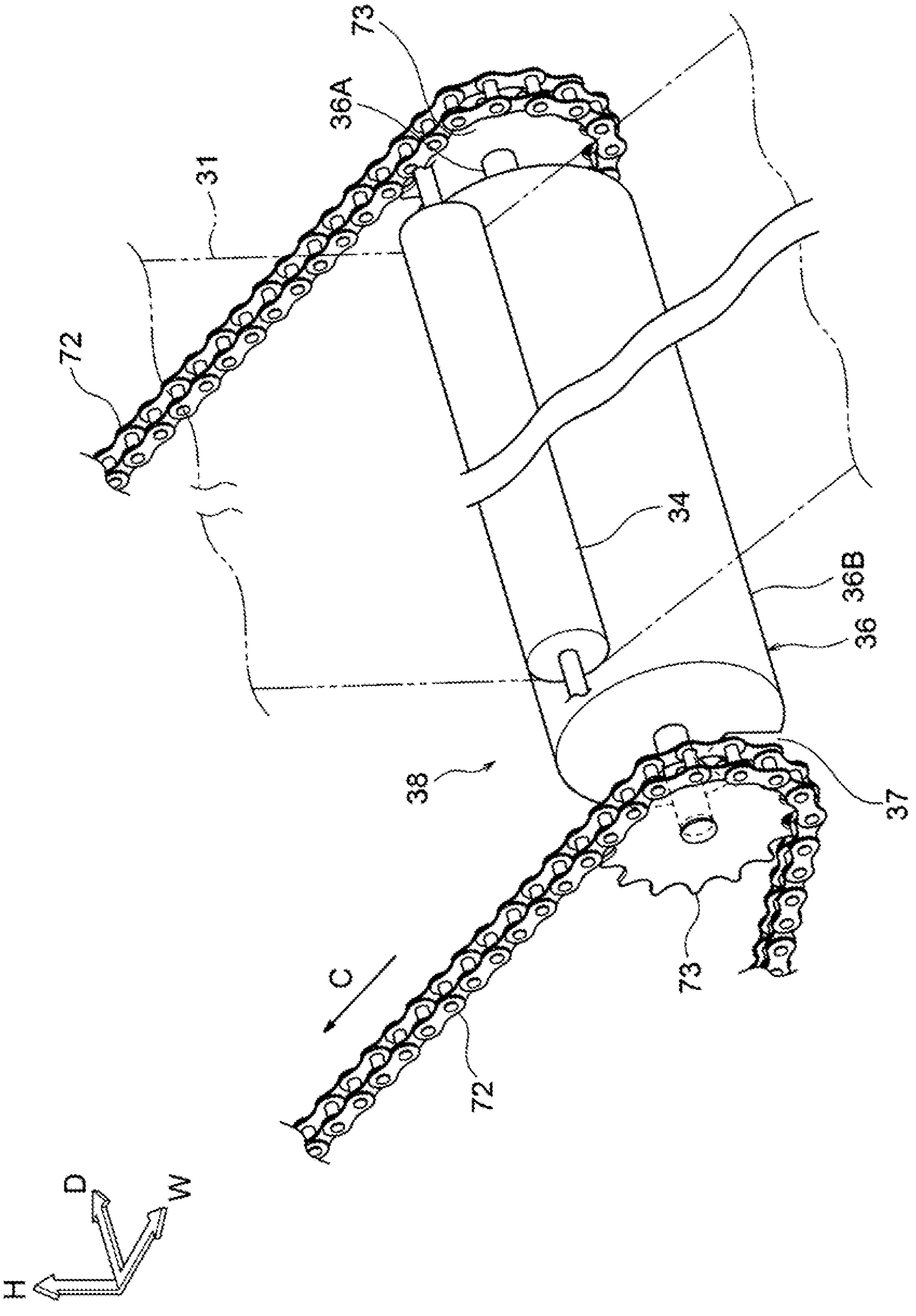
FIG. 4 is a perspective view of an opposing roller and a second transfer roller according to the exemplary embodiment illustrated in FIG. 1.

As illustrated in FIG. 2, the pair of chains 72 are arranged in the apparatus depth direction with an interval therebetween. As illustrated in FIG. 1, the pair of chains 72 each have an endless shape. The pair of chains 72 are wrapped around the pairs of sprockets 71, 73, 92, 94, and 96, the sprockets of each pair being arranged in the apparatus depth direction with an interval therebetween. FIG. 3 illustrates the pair of sprockets 71 arranged in the apparatus depth direction with an interval therebetween, and FIG. 4 illustrates the pair of sprockets 73 arranged in the apparatus depth direction with an interval therebetween. When any one of the pairs of sprockets 71, 73, 92, 94, and 96 rotates, the chains 72 are circulated in the direction of arrow C (see FIG. 1). In some of the figures, teeth provided on the outer peripheries of the sprockets 71, 73, 92, 94, and 96 are omitted.

Referring to FIG. 2, each of the gripping units 68 having the grippers 76 attached thereto extends between the pair of chains 72 in the apparatus depth direction. The gripping units 68 are fixed to the pair of chains 72 with predetermined intervals therebetween in the circumferential direction of the chains 72 (circulation direction C).

As illustrated in FIG. 2, each gripping unit 68 has the grippers 76 attached thereto with predetermined intervals in the apparatus depth direction. The grippers 76 have a function of holding (gripping) the front end portion of the sheet member P. The grippers 76 are examples of a holding portion. More specifically, as illustrated in FIG. 2, each gripper 76 includes a lug 76A and a lug base 76B. The gripper 76 holds the sheet member P by clamping the front end portion of the sheet member P between the lug 76A and the lug base 76B. The gripper 76 is configured such that, for example, the lug 76A is pressed against the lug base 76B by a spring or the like and is moved away from and toward the lug base 76B by an operation of a cam or the like. Thus, in the present exemplary embodiment, each gripper 76 is disposed downstream of the sheet member P in the transporting direction and holds the front end portion of the sheet member P from the downstream side of the sheet member P in the transporting direction.

As illustrated in FIG. 2, the chain gripper 66 transports the sheet member P with one surface of the sheet member P facing upward by circulating the chains 72 in the direction of arrow C while holding the front end portion of the sheet member P with the grippers 76. The chain gripper 66 transports the sheet member P while the trailing end portion of the sheet member P is not held. In other words, the sheet member P is transported while the trailing end portion thereof is free and not retained. The sheet member P passes through the transfer unit 30 and the fixing unit 100 with one surface thereof facing upward in the above-described manner.

Image Forming Unit 12

The image forming unit 12 has a function of forming an image to be transferred to the sheet member P by an inkjet method. As illustrated in FIG. 5, the image forming unit 12 is disposed on the other side (right side in FIG. 5) of the paper feed mechanism 48 in the apparatus width direction. The image forming unit 12 includes plural print heads 20 that form ink images and the transfer unit 30.

The print heads 20 are provided to form ink images of respective colors. In the present exemplary embodiment, four print heads 20 for the respective colors, which are yellow (Y), magenta (M), cyan (C), and black (K), are provided. In FIGS. 1 and 5, the letters 'Y', 'M', 'C', and 'K' represent the respective colors.

The print heads 20Y, 20M, 20C, and 20K have basically the same structure except for the ink used therein. As illustrated in FIG. 1, the print heads 20Y, 20M, 20C, and 20K are arranged along a horizontal portion of the transfer belt 31 in a region downstream of a particle supplying device 18 in the circulation direction of the transfer belt 31.

The print heads 20Y, 20M, 20C, and 20K discharge ink droplets of the respective colors, which are Y, M, C, and K, toward the transfer belt 31 having an ink receptive particle layer 16A formed thereon. The ink droplets of the respective colors are discharged in a superposed manner based on the image information input to the image forming apparatus 10. The ink droplets discharged from the print heads 20Y, 20M, 20C, and 20K are received by the ink receptive particle layer 16A and form an ink image. Thus, the image forming unit 12 forms an image on the transfer belt 31.

Transfer Unit 30

The transfer unit 30 has a function of transferring the image (ink image) formed on the transfer belt 31 to the sheet member P. As illustrated in FIG. 1, the transfer unit 30 includes the transfer belt 31, which serves as an intermediate transfer body, plural rollers 32, a transfer roller 34, and an opposing roller 36. The transfer unit 30 also includes an adhesive-layer forming device 24, a particle supplying device 18, a cleaner 28, and a contact/separation mechanism 38.

As illustrated in FIG. 1, the transfer belt 31 has an endless shape, and is wrapped around the rollers 32 and the transfer roller 34 to form an inverted triangular shape in front view (view in the apparatus depth direction from the front). When at least one of the rollers 32 is rotated, the transfer belt 31 is circulated in the direction of arrow B. The print heads 20 of the respective colors, the particle supplying device 18, the adhesive-layer forming device 24, and the cleaner 28 are arranged along the outer periphery of the transfer belt 31. The transfer belt 31 is provided with a position sensor (not illustrated) that detects the position of the transfer belt 31 and transmits the detection result to the control device 110.

The transfer roller 34 is disposed inside the transfer belt 31. The transfer roller 34 is supported to be capable of being set to a pressing state in which the contact/separation mechanism 38 causes the transfer roller 34 to push outward an inclined portion the transfer belt 31 at one side (left side in FIG. 1) thereof in the apparatus width direction so that the transfer belt 31 is pressed against the opposing roller 36 (described in detail below). The transfer roller 34 is an example of a pressing member. The pressing member may be an independent member or be integrated with a surrounding member. The opposing roller 36 is an example of a transfer cylinder.

The opposing roller 36 is disposed to face the transfer roller 34 with the transfer belt 31 provided therebetween. As illustrated in FIG. 4, the opposing roller 36 extends in the apparatus depth direction.

The opposing roller 36 includes a pair of shaft portions 36A that extend in the apparatus depth direction and a roller portion 36B that serve as a cylindrical portion provided on the outer peripheries of the shaft portions 36A. The above-described sprockets 73 are attached to respective ones of the pair of shaft portions 36A.

The sprockets 73 cause the opposing roller 36 to be rotated in the circulation direction C of the chains 72 of the chain gripper 66 in response to the circulation of the chains 72.

The roller portion 36B of the opposing roller 36 has a recessed portion 37 capable of receiving the grippers 76 therein. The recessed portion 37 has the shape of a groove that extends from one end to the other end of the roller portion 36B in the apparatus depth direction.

The opposing roller 36 has a heating source (not illustrated) disposed therein, and is configured to be capable of heating an outer peripheral portion thereof.

The opposing roller 36 forms a nip region NT between the opposing roller 36 and the transfer roller 34 that pushes the transfer belt 31 outward to press the transfer belt 31 against the opposing roller 36. In other words, the nip region NT is formed between the opposing roller 36 and the transfer belt 31. The opposing roller 36 rotated by the circulation of the chains 72 causes the transfer belt 31 to move along therewith in the nip region NT. The opposing roller 36 nips the sheet member P transported by the chain gripper 66 between the heated outer peripheral portion thereof and the transfer belt 31 in the nip region NT, and causes the transfer belt 31 to move along therewith so that the ink image formed on the transfer belt 31 is transferred to the sheet member P.

As illustrated in FIG. 1, the adhesive-layer forming device 24 is disposed on the horizontal portion of the transfer belt 31 in the inverted triangular shape at one end (left end in FIG. 1) thereof in the apparatus width direction. The adhesive-layer forming device 24 contains an adhesive, and applies the adhesive to the outer peripheral surface of the transfer belt 31 that is circulated to form an adhesive layer (not illustrated). The adhesive may be, for example, a glue or an organic solvent.

The particle supplying device 18 is disposed on the horizontal portion of the transfer belt 31 at a location downstream of the adhesive-layer forming device 24 in the circulation direction of the transfer belt 31. The particle supplying device 18 contains ink receptive particles 16 capable of receiving ink droplets, and supplies the ink receptive particles 16 to the transfer belt 31 on which the adhesive layer is formed. As a result, the ink receptive particles 16 supplied to the transfer belt 31 by the particle supplying device 18 are retained on the adhesive layer by the adhesion of the adhesive layer, so that the ink receptive particle layer 16A is formed on the transfer belt 31.

The ink receptive particle layer 16A formed on the transfer belt 31 comes into contact with the sheet member P nipped between the transfer belt 31 and the opposing roller 36 in the nip region NT, and is heated by the opposing roller 36, so that the ink receptive particle layer 16A is transferred to the sheet member P. When the ink receptive particle layer 16A has ink droplets received thereon so that an ink image is formed on the ink receptive particle layer 16A, the ink image is transferred to the sheet member P together with the ink receptive particle layer 16A.

The cleaner 28 is disposed downstream of the nip region NT in the circulation direction of the transfer belt 31 and upstream of the adhesive-layer forming device 24 in the circulation direction. The cleaner 28 includes a blade 28*a* that is in contact with the outer peripheral surface of the transfer belt 31. The cleaner 28 is configured such that the blade 28*a* removes the adhesive layer, the ink receptive particles 16, and other foreign substances (for example, paper dust when the sheet member P is paper) that remain on a portion of the transfer belt 31 that has passed through the nip region NT due to the circulation of the transfer belt 31.

Fixing Unit 100

The fixing unit 100 has a function of fixing the ink image that has been transferred to the sheet member P by the transfer unit 30 to the sheet member P.

As illustrated in FIG. 1, the fixing unit 100 includes a preliminary heating unit 102 that preliminarily heats the sheet member P transported by the chain gripper 66; a heating unit 120 that heats the sheet member P; and a blowing unit 168 that blows air against the sheet member P. The fixing unit 100 also includes the above-described chain gripper 66 and a moving mechanism 180 described below.

As illustrated in FIG. 1, the preliminary heating unit 102 is disposed downstream of the nip region NT in a direction in which the sheet member P is transported (hereinafter referred to as a "sheet transporting direction" as appropriate), and faces the upper surface of the sheet member P that is transported. The preliminary heating unit 102 includes a reflective member 104, plural infrared heaters 106 (hereinafter referred to as "heaters 106" as appropriate), and a wire gauze 112. In this structure, the preliminary heating unit 102 heats the sheet member P in the thickness direction without coming into contact therewith while the sheet member P is transported by the chains 72 that are circulated.

As illustrated in FIG. 1, the blowing unit 168 is disposed to face the preliminary heating unit 102 in the thickness direction of the sheet member P that is transported. The transported sheet member P passes through the space between the blowing unit 168 and the preliminary heating unit 102. The blowing unit 168 includes plural fans 169 that are arranged in the width direction of the transported sheet member P and in the sheet transporting direction. In this structure, the fans 169 blow air against the transported sheet member P to stabilize the position of the transported sheet member P.

As illustrated in FIG. 1, the heating unit 120 is disposed downstream of the preliminary heating unit 102 in the sheet transporting direction. As illustrated in FIG. 3, the heating unit 120 includes a heating roller 130 that comes into contact with the sheet member P that is transported and heats the sheet member P, and a pressing roller 140 that nips the sheet member P between the pressing roller 140 and the heating roller 130 and presses the sheet member P against the heating roller 130. The heating roller 130 is an example of a second rotating body. The pressing roller 140 is an example of a first rotating body.

Pressing Roller 140

The pressing roller 140 has a function of nipping the sheet member P between the pressing roller 140 and the heating roller 130 and pressing the sheet member P. More specifically, as illustrated in FIG. 3, the pressing roller 140 includes a shaft portion 140A that extends in the apparatus depth direction, a roller portion 140B that serves as a cylindrical portion provided on the outer periphery of the shaft portion 140A, and a recessed portion 142 provided in the outer surface of the roller portion 140B. The sprockets 71 are attached to both ends of the shaft portion 140A.

The sprockets 71 cause the pressing roller 140 to be rotated in the rotation direction E in response to the circulation of the chains 72.

Referring to FIG. 3, the recessed portion 142 is capable of receiving the grippers 76 and the gripping unit 68 therein, and has the shape of a groove that extends from one end to the other end of the roller portion 140B in the apparatus depth direction. The recessed portion 142 opens outward in the radial direction of the pressing roller 140.

Heating Roller 130

Figure 6:
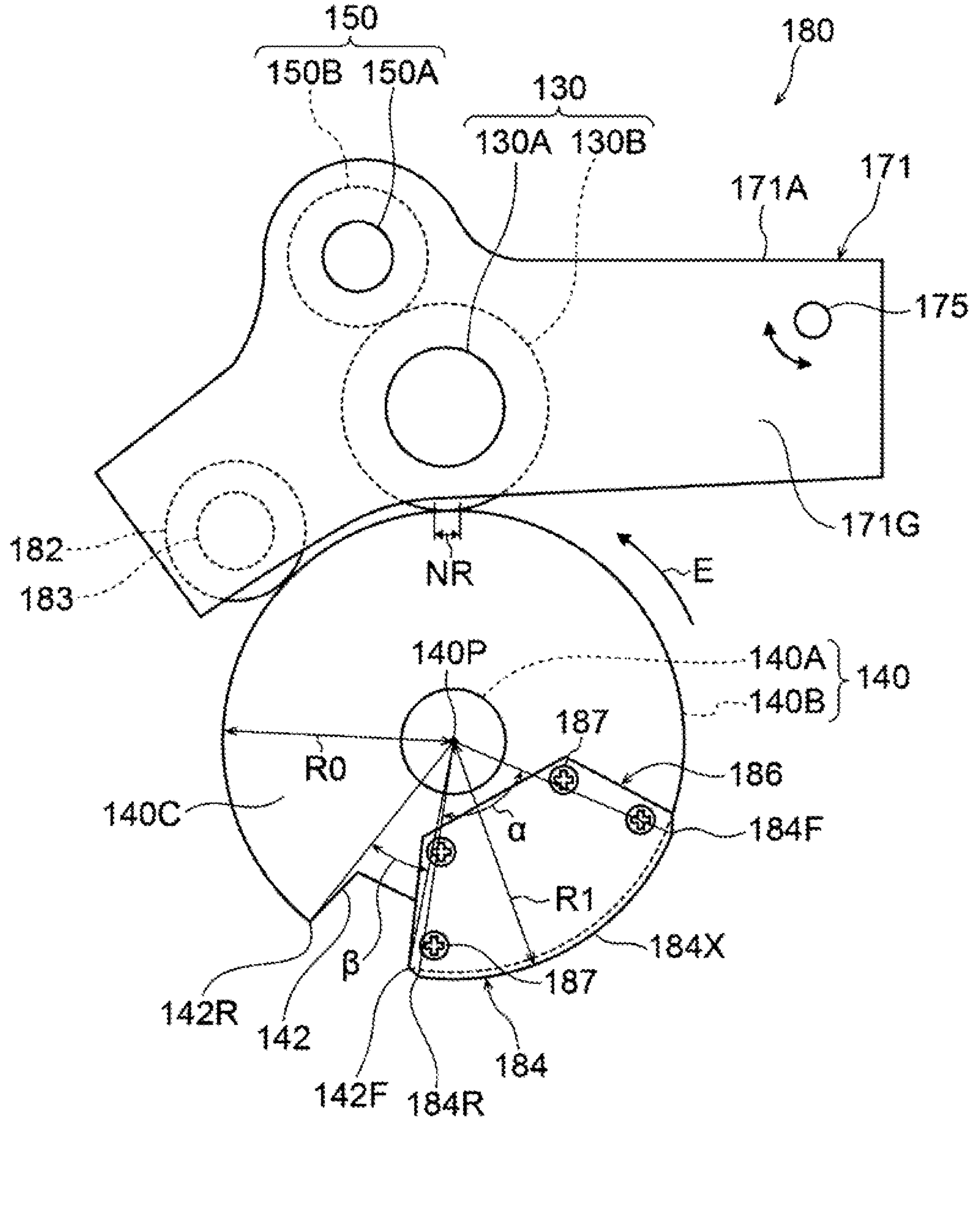
FIG. 6 is a front view of a part of the fixing device according to the exemplary embodiment illustrated in FIG. 1.
Figure 7:
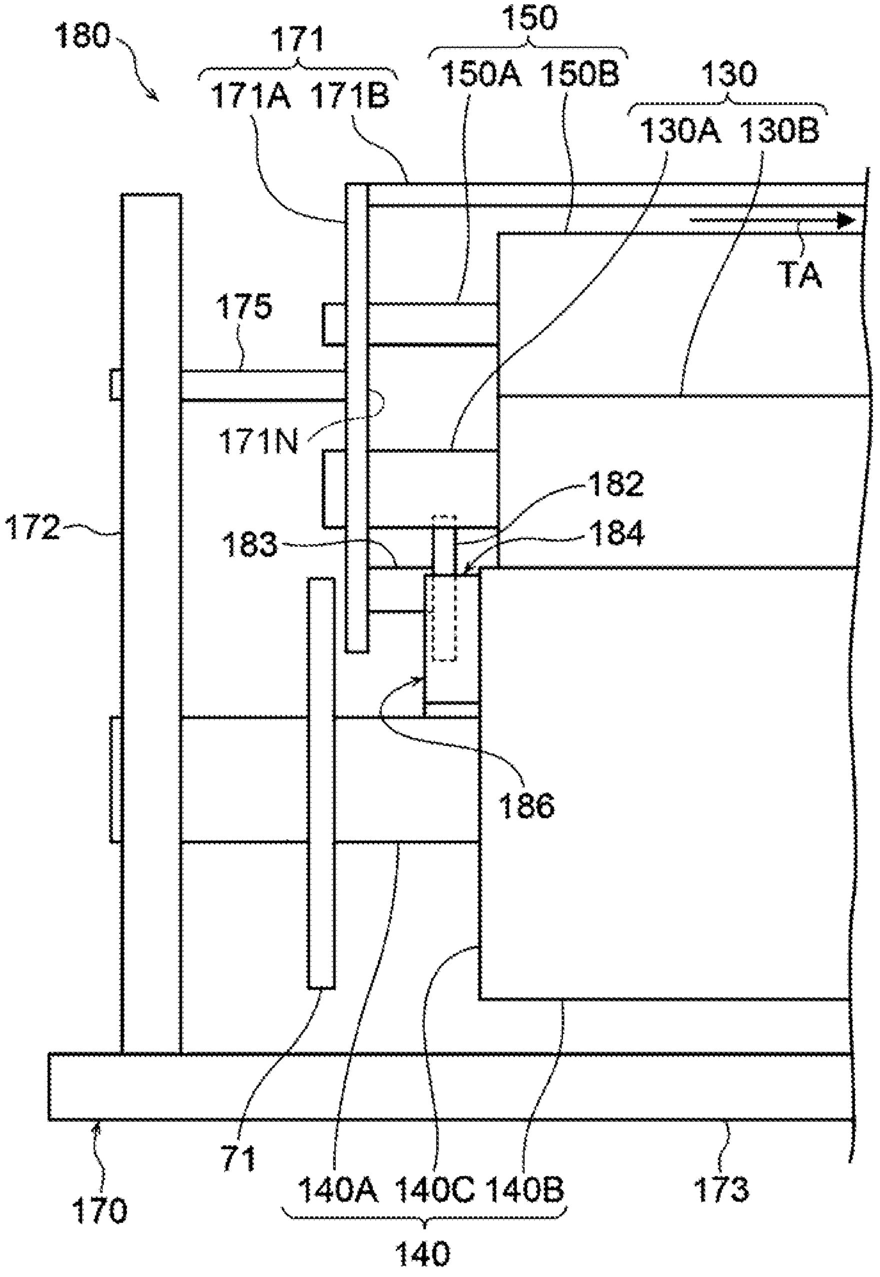
FIG. 7 is a side view of a part of the fixing device according to the exemplary embodiment illustrated in FIG. 1.

The heating roller 130 has a function of heating the sheet member P. More specifically, as illustrated in FIGS. 6 and 7, the heating roller 130 includes a shaft portion 130A and a roller portion 130B formed on the outer periphery of the shaft portion 130A.

An outer peripheral surface (example of an outer surface) of the roller portion 130B of the heating roller 130 and an outer peripheral surface (example of an outer surface) of the roller portion 140B of the pressing roller 140 are in contact with each other to form a nip region NR (example of a nipping region) in which the sheet member P is nipped by the heating roller 130 and the pressing roller 140.

The heating unit 120 further includes a heat source roller 150. The heat source roller 150 has a function of heating the heating roller 130. More specifically, the heat source roller 150 is in contact with the heating roller 130 to heat the heating roller 130. As illustrated in FIGS. 6 and 7, the heat source roller 150 includes a shaft portion 150A and a roller portion 150B formed on the outer periphery of the shaft portion 150A.

The heating unit 120 further includes a support body 170. The support body 170 illustrated in FIG. 7 has a function of supporting the pressing roller 140, the heating roller 130, and the heat source roller 150. Referring to FIG. 7, the support body 170 includes a first frame 171, a pair of second frames 172, and a bottom wall 173. In FIG. 7, only one of the pair of second frames 172 is illustrated.

The bottom wall 173 is disposed below the pressing roller 140. The bottom wall 173 is plate-shaped and has a thickness in the up-down direction.

The first frame 171 includes a pair of side walls 171A and a connecting wall 171B. The pair of side walls 171A are disposed on both sides of the heating roller 130 in the axial direction.

As illustrated in FIG. 6, each side wall 171A is disposed above the pressing roller 140. When viewed in the axial direction of the heating roller 130, the side walls 171A extend along the chains 72 in a region upstream of the nip region NR in the sheet transporting direction, and along the circumferential direction of the pressing roller 140 in a region downstream of the nip region NR in the sheet transporting direction (see FIG. 6).

As illustrated in FIG. 7, the connecting wall 171B extends in the axial direction of the heating roller 130 from one of the pair of side walls 171A toward the other. The connecting wall 171B connects the upper portions of the pair of side walls 171A to each other.

The pair of side walls 171A support the heating roller 130 in a rotatable manner. The pair of side walls 171A also support the heat source roller 150 in a rotatable manner at a location above the heating roller 130.

Each of the pair of side walls 171A has a cam follower 182 described below on an inner surface 171N thereof. The inner surfaces 171N of the pair of side walls 171A are surfaces that face each other at the sides opposite to outer surfaces 171G of the pair of side walls 171A.

The pair of second frames 172 are provided on the bottom wall 173 so as to extend upward from the bottom wall 173 at locations outside the pair of side walls 171A. The locations outside the pair of side walls 171A are locations at the sides opposite to the sides at which the pair of side walls 171A face each other (see arrow TA in FIG. 7). In other words, the pair of second frames 172 are disposed on both sides of the pressing roller 140 and the heating roller 130 in the axial direction. The second frames 172 are plate-shaped and have a thickness in the axial direction of the pressing roller 140.

The pair of second frames 172 support the pressing roller 140 in a rotatable manner. More specifically, the pair of second frames 172 support the shaft portion 140A of the pressing roller 140 in a rotatable manner at both ends thereof in the axial direction. Still more specifically, the pair of second frames 172 support the shaft portion 140A of the pressing roller 140 in a rotatable manner at locations outside the roller portion 140B in the axial direction (more specifically, outside cam portions 184 described below in the axial direction).

In addition, the pair of second frames 172 support the first frame 171 with rotating shafts 175 such that the first frame 171 is rotatable around the rotating shafts 175. As illustrated in FIG. 6, the rotating shafts 175 are disposed upstream of the nip region NR in the sheet transporting direction.

Figure 8:
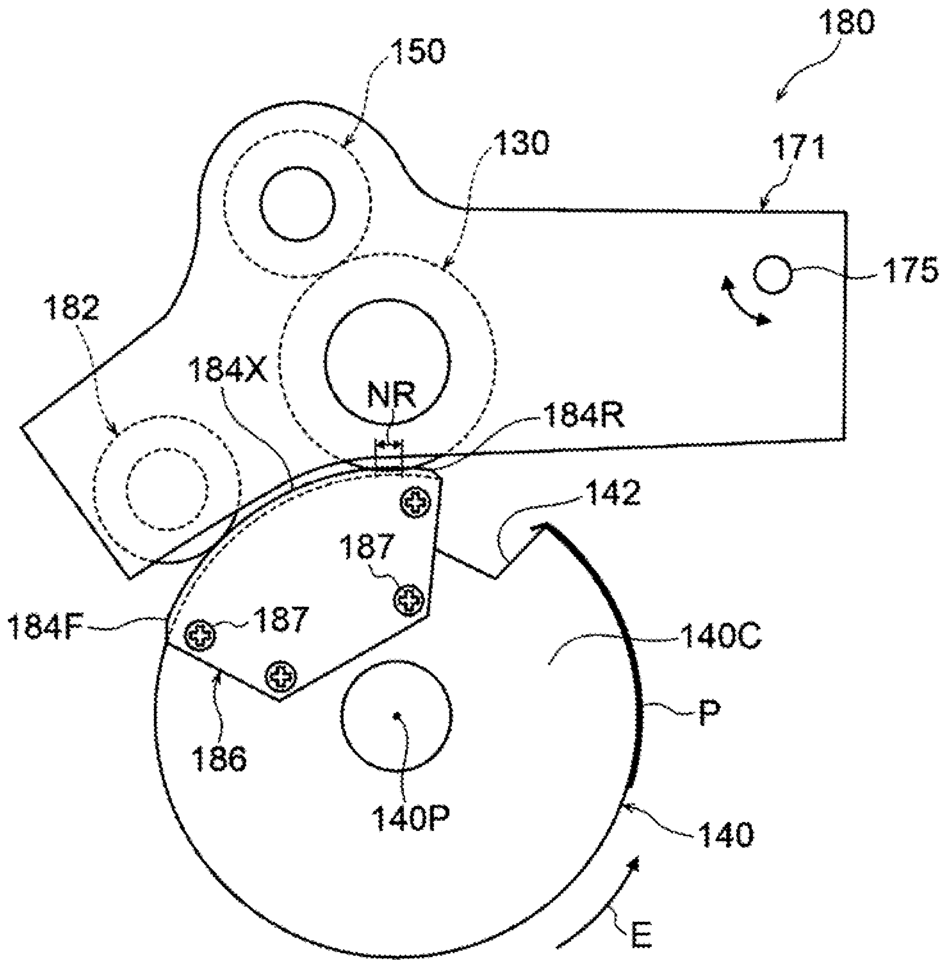
FIG. 8 is a front view of the part of the fixing device illustrated in FIG. 6 in which a heating roller is at a retracted position.

More specifically, the pair of second frames 172 support the first frame 171 at a location upstream of the nip region NR in the sheet transporting direction such that the heating roller 130 is movable between a nip position illustrated in FIG. 6 and a retracted position illustrated in FIG. 8.

In other words, the heating roller 130 is movable between the nip position illustrated in FIG. 6 and the retracted position illustrated in FIG. 8 around a fulcrum located upstream of the nip region NR in the sheet transporting direction. The nip position is a position at which the distance from the pressing roller 140 to the heating roller 130 is equal to the distance at which the nip region NR is formed. The retracted position is a position at which the distance from the pressing roller 140 to the heating roller 130 is greater than the distance at the nip position. The distance from the pressing roller 140 to the heating roller 130 is the distance between the axes of the pressing roller 140 and the heating roller 130.

The first frame 171 is pushed or pulled by an elastic force of an elastic member, such as a spring, so that the heating roller 130 is at the nip position. In other words, the heating roller 130 is pushed or pulled toward the nip position.

The heating unit 120 fixes the ink image formed on the sheet member P to the sheet member P by applying heat and pressure to the sheet member P with the heating roller 130 and the pressing roller 140.

Moving Mechanism 180

The moving mechanism 180 illustrated in FIG. 6 is an example of a moving mechanism that moves the heating roller 130 relative to the pressing roller 140. More specifically, the moving mechanism 180 is a mechanism that moves the heating roller 130. Still more specifically, referring to FIGS. 6 and 7, the moving mechanism 180 includes the cam followers 182 and the cam portions 184. The cam followers 182 are examples of a contact portion.

The cam followers 182 are provided on the inner surfaces 171N of the pair of side walls 171A of the first frame 171. More specifically, as illustrated in FIG. 7, each cam follower 182 is rotatably supported by an end portion of a shaft portion 183 that projects inward from the inner surface 171N of the corresponding side wall 171A.

Still more specifically, each cam follower 182 is disposed downstream of the nip region NR in the sheet transporting direction. In other words, the cam follower 182 is disposed downstream of the heating roller 130 in the rotation direction of the pressing roller 140. Namely, the cam follower 182 is displaced downstream from the heating roller 130 in the rotation direction of the pressing roller 140 by a distance corresponding to a predetermined rotation angle of the pressing roller 140.

As illustrated in FIG. 6, each cam follower 182 is disc-shaped and has a circular shape when viewed in the axial direction of the heating roller 130. The cam follower 182 has an outer diameter less than the outer diameter of the heating roller 130 and the outer diameter of the pressing roller 140. In FIGS. 6 and 7, only one of the pair of cam followers 182 is illustrated.

Referring to FIGS. 6 and 7, the cam portions 184 are provided on the pressing roller 140. More specifically, the cam portions 184 are provided on respective ones of side surfaces 140C of the roller portion 140B of the pressing roller 140. Still more specifically, as illustrated in FIG. 7, attachment members 186 including the cam portions 184 are attached to the side surfaces 140C of the roller portion 140B with fastening members 187. The fastening members 187 may be, for example, screw members. In this structure, the attachment members 186 are attached to the pressing roller 140 in a replaceable manner. In FIGS. 6 and 7, only one of the pair of cam portions 184 is illustrated.

As illustrated in FIGS. 6 and 7, each attachment member 186 is a substantially sector-shaped plate member. An arc portion of the sector-shaped attachment member 186 serves as the cam portion 184, and the remaining portion serves as an attachment portion that is attached to the corresponding side surface 140C of the roller portion 140B. The attachment portion has attachment holes (not illustrated) through which the above-described fastening members 187 are inserted. When viewed in the axial direction of the pressing roller 140, the attachment member 186 is attached to the side surface 140C of the roller portion 140B at a position such that the attachment member 186 does not overlap the recessed portion 142. In the present exemplary embodiment, when viewed in the axial direction of the pressing roller 140, a side surface of the attachment member 186 at the upstream side in the rotation direction of the pressing roller 140 extends along a groove wall surface of the recessed portion 142 at the downstream side in the rotation direction of the pressing roller 140.

The cam portion 184 is disposed downstream of the recessed portion 142 in the pressing roller 140 in the rotation direction of the pressing roller 140. More specifically, the cam portion 184 is displaced downstream from the recessed portion 142 in the pressing roller 140 in the rotation direction of the pressing roller 140 by a distance corresponding to a predetermined rotation angle of the pressing roller 140.

The cam portion 184 and the attachment member 186 rotate together with the pressing roller 140, and the cam portion 184 comes into contact with the cam follower 182 at a position at which the cam portion 184 faces the cam follower 182 (upper left position in FIG. 6). More specifically, the cam portion 184 comes into contact with the cam follower 182 before the heating roller 130 enters the recessed portion 142. When the cam portion 184 comes into contact with the cam follower 182, the heating roller 130 is separated from the pressing roller 140.

As illustrated in FIG. 6, the cam portion 184 has a cam surface 184X that is positioned outside the outer surface of the roller portion 140B of the pressing roller 140 in the radial direction of the pressing roller 140. More specifically, when the attachment member 186 is attached to the side surface 140C of the roller portion 140B, the cam portion 184 of the attachment member 186 protrudes outward from the outer surface of the roller portion 140B in the radial direction of the pressing roller 140. The cam surface 184X of the cam portion 184 is a part of the cam portion 184 that comes into contact with the cam follower 182 and that has a substantially constant radius of curvature (variation in the radius of curvature is within ±5%).

Referring to FIG. 6, a radius of curvature R1 of the cam surface 184X of the cam portion 184 is in the range of 80% to 120% of a radius R0 of the roller portion 140B of the pressing roller 140. More specifically, the radius of curvature R1 may be in the range of 90% to 115% of the radius R0, or in the range of 100% to 110% of the radius R0.

In addition, as illustrated in FIG. 6, an angle $\alpha$ around a rotation axis 140P of the pressing roller 140 between both ends 184F and 184R of the cam surface 184X in the rotation direction of the pressing roller 140 is greater than an angle β around the rotation axis 140P of the pressing roller 140 between both opening ends 142F and 142R of the recessed portion 142 in the rotation direction of the pressing roller 140. In the following description, the downstream end of the cam surface 184X in the rotation direction of the pressing roller 140 is referred to as the front end 184F, and the upstream end of the cam surface 184X in the rotation direction of the pressing roller 140 is referred to as the rear end 184R. In addition, the downstream opening end of the recessed portion 142 in the rotation direction of the pressing roller 140 is referred to as the front opening end 142F, and the upstream opening end of the recessed portion 142 in the rotation direction of the pressing roller 140 is referred to as the rear opening end 142R.

As illustrated in FIGS. 6 and 8, the cam surface 184X of the cam portion 184 comes into contact with the cam follower 182 in response to the rotation of the pressing roller 140, and moves the heating roller 130 between the nip position and the retracted position. More specifically, the heating roller 130 moves as described below in response to a change in the contact position between the cam follower 182 and the cam portion 184.

The heating roller 130 starts to move from the nip position (position illustrated in FIG. 6) to the retracted position (position illustrated in FIG. 8) before the recessed portion 142 in the pressing roller 140 reaches the nip region NR. More specifically, as illustrated in FIG. 8, the cam follower 182 comes into contact with the cam portion 184 so that the heating roller 130 is moved to the retracted position.

Figure 9:
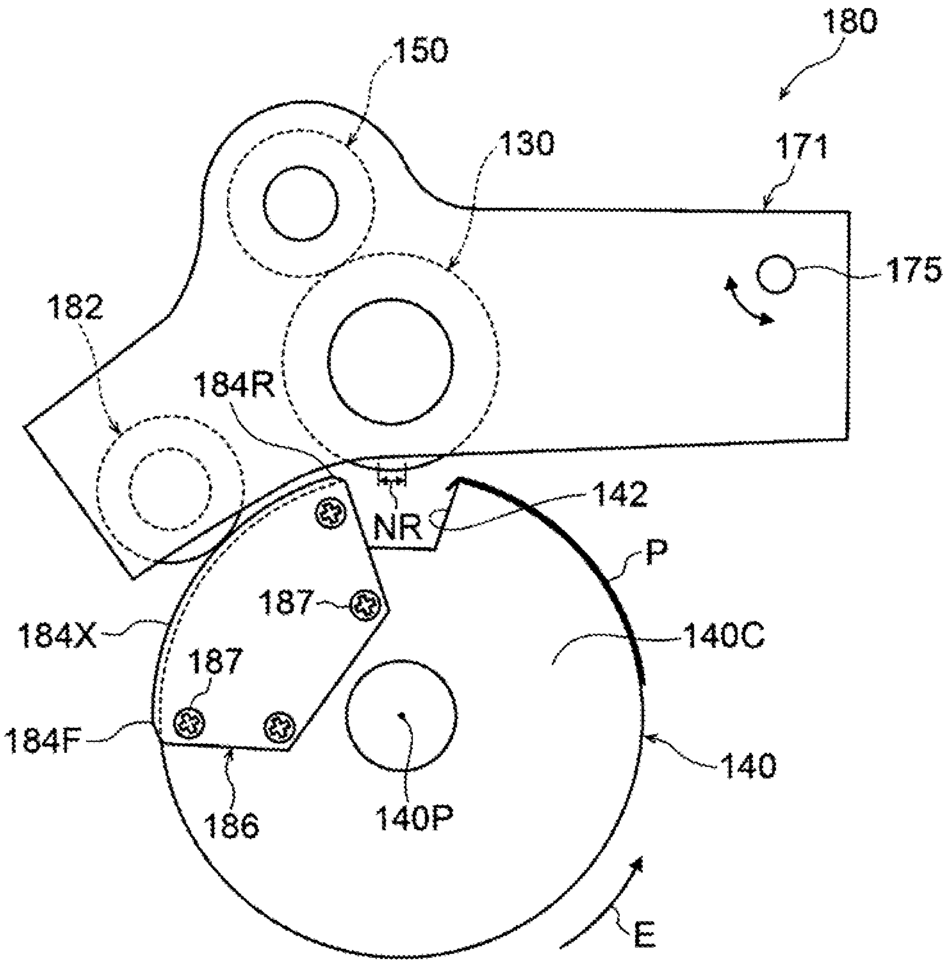
FIG. 9 is a front view of the part illustrated in FIG. 8 in which the heating roller at the retracted position moves past a recessed portion in a pressing roller.
Figure 10:
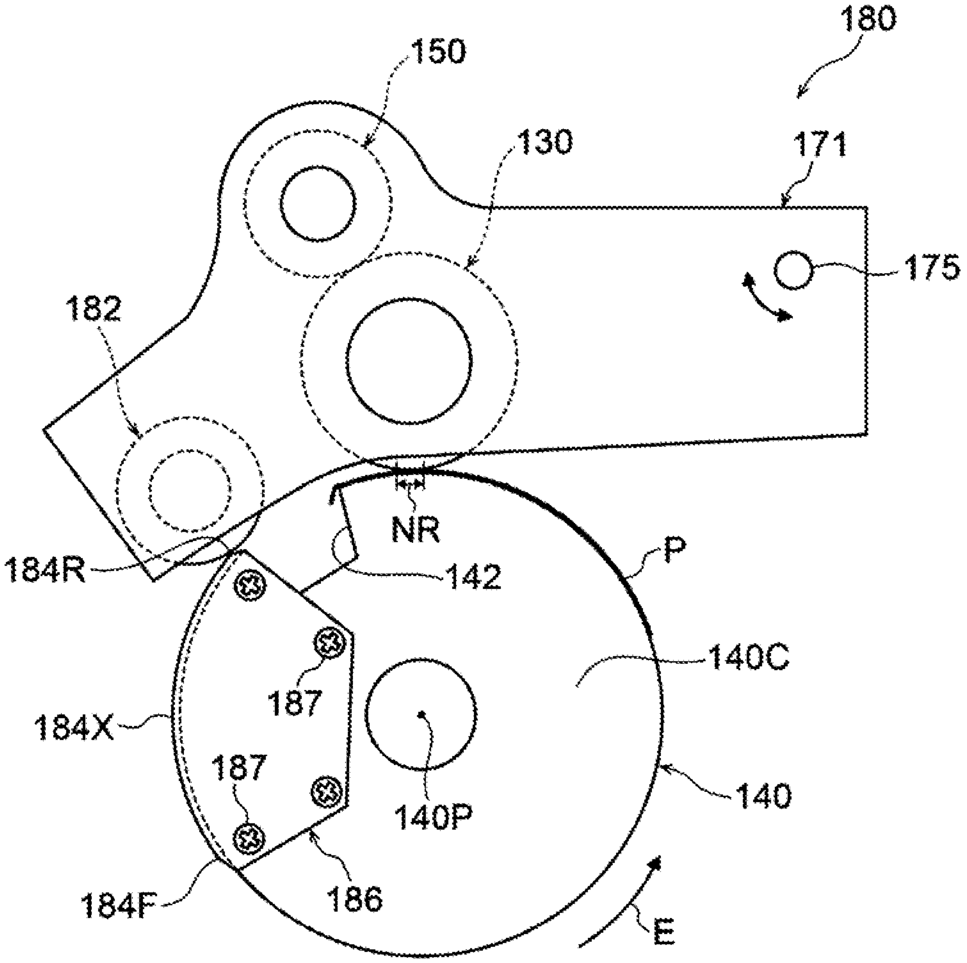
FIG. 10 is a front view of the part illustrated in FIG. 8 in which the heating roller has moved past the recessed portion in the pressing roller and returned to a nip position.

As the pressing roller 140 rotates, as illustrated in FIG. 9, the cam follower 182 rolls along the cam surface 184X of the cam portion 184. When the cam follower 182 reaches the rear end 184R of the cam surface 184X, as illustrated in FIG. 10, the heating roller 130 moves to the nip position (in other words, returns to the nip position). Accordingly, the sheet member P held by the grippers 76 disposed in the recessed portion 142 is nipped between the heating roller 130 and the pressing roller 140, and the ink image is fix to the sheet member P by the heating roller 130 and the pressing roller 140. In FIGS. 8 to 10, the sheet member P held by the grippers 76 is illustrated, but the grippers 76 are not illustrated.

The operation of the present exemplary embodiment will now be described.

In the present exemplary embodiment, each cam follower 182 connected to the heating roller 130 comes into contact with the corresponding cam portion 184 of the pressing roller 140 before the heating roller 130 enters the recessed portion 142. When the cam follower 182 comes into contact with the cam portion 184, the heating roller 130 is separated from the pressing roller 140. When the heating roller 130 moves past the recessed portion 142 while being separated from the pressing roller 140, the cam follower 182 moves past the cam portion 184 so that the heating roller 130 moves to the nip position at which the heating roller 130 is in contact with the pressing roller 140. According to this structure, the heating roller 130 does not fall into the recessed portion 142. The cam portion 184 is provided on each side surface 140C of the roller portion 140B of the pressing roller 140.

In the present exemplary embodiment, the cam surface 184X of each cam portion 184 is positioned outside the outer surface of the roller portion 140B of the pressing roller 140 in the radial direction. Therefore, when the cam follower 182 rolls along the cam surface 184X, the side surface of the cam follower 182 may be prevented from coming into contact with the side surface 140C of the roller portion 140B.

In the present exemplary embodiment, the amount by which the heating roller 130 swings is less than when the radius of curvature R1 of the cam surface 184X of each cam portion 184 is greater than 120% of the radius R0 of the roller portion 140B. In addition, the amount by which the heating roller 130 swings is less than when the radius of curvature R1 of the cam surface 184X of each cam portion 184 is less than 80% of the radius R0 of the roller portion 140B.

In the present exemplary embodiment, the angle α of each cam portion 184 is greater than the angle β of the recessed portion 142.

In the present exemplary embodiment, the rotating shafts 175, which serve as a fulcrum, and the cam followers 182, which serve as a point of application of force, are located on the opposite sides of the nip region NR in the transporting direction of the sheet member P. More specifically, each rotating shaft 175 is disposed upstream of the nip region NR in the transporting direction of the sheet member P, and each cam follower 182 is disposed downstream of the nip region NR in the transporting direction of the sheet member P.

In the present exemplary embodiment, when viewed in the axial direction of the pressing roller 140, the attachment members 186 including the cam portions 184 are attached to the side surfaces 140C of the roller portion 140B at a position such that the attachment members 186 do not overlap the recessed portion 142.

In the present exemplary embodiment, the attachment members 186 including the cam portions 184 are attached to the side surfaces 140C of the roller portion 140B in a replaceable manner.

In the present exemplary embodiment, the cam portions 184 are provided on the respective side surfaces 140C of the roller portion 140B, and two cam followers 182 are provided on respective ones of the pair of side walls 171A of the first frame 171 of the support body 170 for the respective cam portions 184. In other words, the two cam followers 182 are connected to both sides of the heating roller 130 in the axial direction by the pair of side walls 171A of the first frame 171 that support the shaft portion 130A of the heating roller 130.

Figure 11:
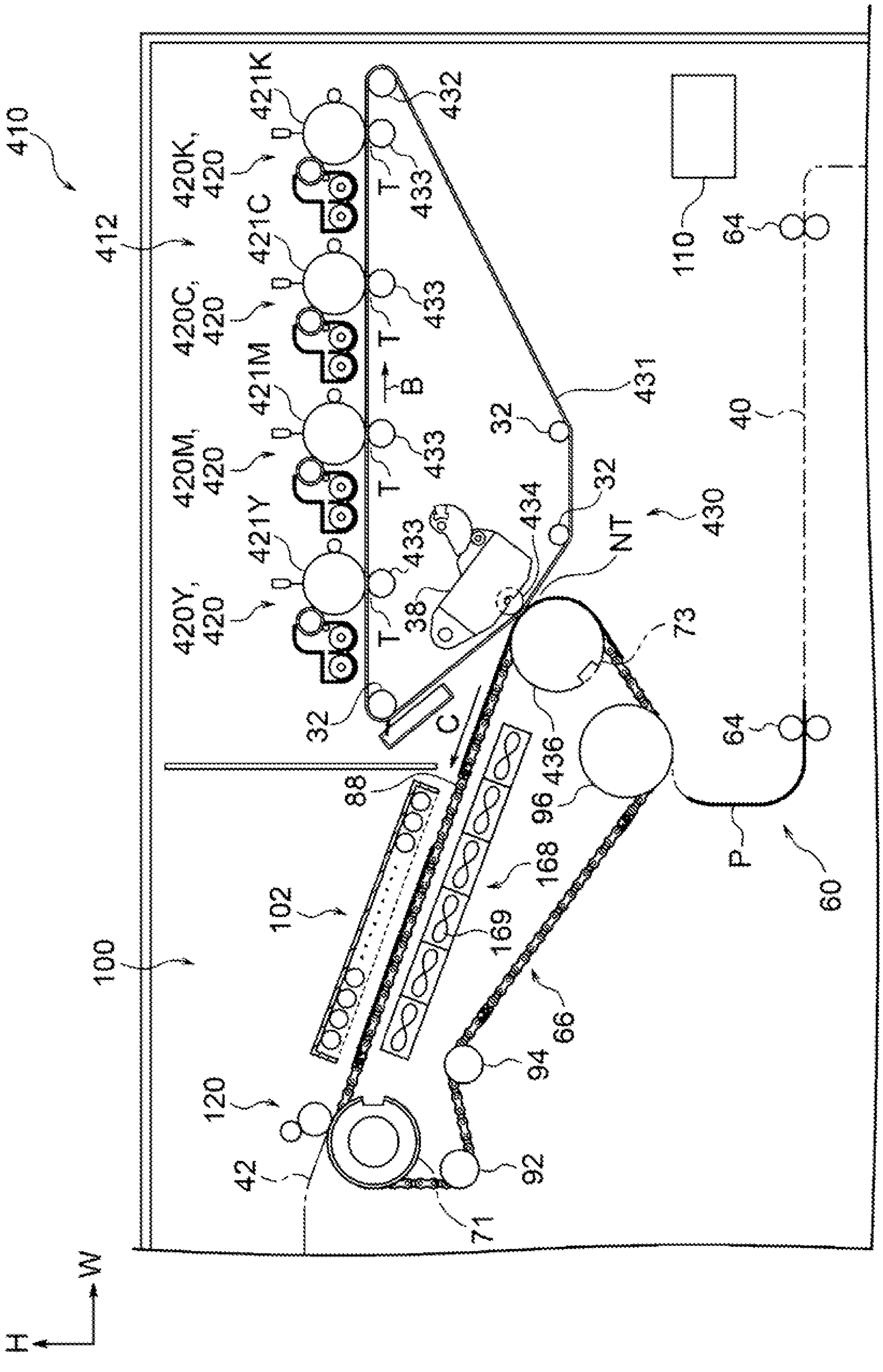
FIG. 11 is a schematic front view of a part of an electrophotographic image forming apparatus according to another exemplary embodiment.

The above-described operation of the present disclosure is not limited to an inkjet image forming apparatus, and may be similarly applied to an electrophotographic image forming apparatus that forms an image with toner. An image forming apparatus 410 will now be described as an example of an electrophotographic image forming apparatus according to an exemplary embodiment of the present disclosure. Referring to FIG. 11, the image forming apparatus 410 includes an image forming unit 412 and a transfer unit 430 instead of the image forming unit 12 and the transfer unit 30 of the image forming apparatus 10. The transfer unit 430 includes a transfer belt 431, a second transfer roller 434, and an opposing roller 436 instead of the transfer belt 31, the transfer roller 34, and the opposing roller 36. The transfer unit 430 also includes first transfer rollers 433 around which the transfer belt 431 is wrapped and that correspond to respective colors of the image. The image forming unit 412 includes toner image forming units 420Y, 420M, 420C, and 420K that form toner images instead of the print heads 20 of the image forming apparatus 10. The toner image forming units 420 of the respective colors include photoconductor drums 421 of the respective colors that are disposed to face respective ones of the first transfer rollers 433 with the transfer belt 431 disposed therebetween. The toner image forming units 420 form toner images on the photoconductor drums 421 of the respective colors, and transfer the toner images to the transfer belt 431 at first transfer positions T formed between the photoconductor drums 421 and the first transfer rollers 433. The toner images that have been transferred to the transfer belt 431 are transferred to the sheet member P at a nip region NT formed between the second transfer roller 434 and the opposing roller 436. In other respects, the structure of the electrophotographic image forming apparatus 410 is similar to that of the inkjet image forming apparatus 10.

Although the cam followers 182 are attached to the first frame 171 of the support body 170 in the above-described exemplary embodiment, the present disclosure is not limited to this structure. For example, the cam followers 182 may instead be attached to the shaft portion 130A of the heating roller 130 with a bracket (not illustrated), or be attached to the roller portion 130B of the heating roller 130 with a bracket (not illustrated).

In the above-described exemplary embodiment, as illustrated in FIG. 6, each rotating shaft 175 is disposed upstream of the nip region NR in the transporting direction of the sheet member P. However, the rotating shaft 175 is not limited to this. For example, the rotating shaft 175 may instead be disposed downstream of the nip region NR in the transporting direction. In such a case, for example, each cam follower 182 is disposed upstream of the nip region NR in the transporting direction.

Although the grippers 76 hold the front end portion of the sheet member P in the above-described exemplary embodiment, the grippers 76 are not limited to this. For example, the grippers 76 may instead hold a front end section of the sheet member P at side edges of the sheet member P. The front end section of the sheet member P means a section of the sheet member P that is downstream of (in front of) the center of the sheet member P in the transporting direction.

In addition, although the fixing device having a transport function of transporting the sheet member P and a fixing function of fixing an image to the sheet member P is described as an example of a transport device in the above-described exemplary embodiment, the transport device is not limited to this. Examples of the transport device also include a device having only the transport function and a device having the transport function and a function other than the fixing function.

The present disclosure is not limited to the above-described exemplary embodiments, and various modifications, alterations, and improvements are possible without departing from the spirit thereof. For example, the above-described modifications may be applied in combination with each other as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A transport device comprising:

a first rotating body including a shaft portion, a cylindrical portion on an outer periphery of the shaft portion, and a recessed portion in an outer surface of the cylindrical portion;

a second rotating body configured to move toward and away from the first rotating body, the second rotating body being configured to rotate while being in contact with an outer surface of the first rotating body and nipping a recording medium between the second rotating body and the first rotating body;

a transport unit including a holding portion configured to hold a front end section of the recording medium, the transport unit being configured to transport the recording medium by moving the holding portion in a rotation direction of the first rotating body while the holding portion is in the recessed portion; and a moving mechanism including a cam portion on a side surface of the cylindrical portion and a contact portion that is connected to the second rotating body and that is configured to come into contact with the cam portion to separate the second rotating body from the first rotating body before the second rotating body enters the recessed portion, wherein the second rotating body is swingable about a fulcrum upstream of a nipping region, in which the recording medium is nipped between the second rotating body and the first rotating body, in a transporting direction of the recording medium, the contact portion is downstream of the nipping region in the transporting direction of the recording medium, and an attachment member including the cam portion is attached to the side surface of the cylindrical portion such that the attachment member does not overlap the recessed portion when viewed in an axial direction of the first rotating body.

2. The transport device according to claim 1, wherein the cam portion has a cam surface that is outside the outer surface of the cylindrical portion in a radial direction.

3. The transport device according to claim 2, wherein the cam surface of the cam portion has a radius of curvature of 80% to 120% of a radius of the cylindrical portion.

4. The transport device according to claim 3, wherein an angle around a rotation axis of the first rotating body between both ends of the cam surface in the rotation direction is greater than an angle around the rotation axis of the first rotating body between both opening ends of the recessed portion in the rotation direction.

5. The transport device according to claim 2, wherein an angle around a rotation axis of the first rotating body between both ends of the cam surface in the rotation direction is greater than an angle around the rotation axis of the first rotating body between both opening ends of the recessed portion in the rotation direction.

6. The transport device according to claim 1, wherein an angle around a rotation axis of the first rotating body between both ends of a cam surface of the cam portion in the rotation direction is greater than an angle around the rotation axis of the first rotating body between both opening ends of the recessed portion in the rotation direction.

7. The transport device according to claim 1, wherein an attachment member including the cam portion is attached to the side surface of the cylindrical portion in a replaceable manner.

8. The transport device according to claim 1, wherein the cam portion is on each side surface of the cylindrical portion, and the contact portion is connected to each side of the second rotating body in an axial direction of the first rotating body.

9. A fixing device that serves as the transport device according to claim 1, wherein the first rotating body is a pressing roller and the second rotating body is a heating roller.

10. An image forming apparatus comprising:

a transfer unit configured to transfer an image to a recording medium; and the fixing device according to claim 9 that fixes the image to the recording medium.

11. A transport device comprising:

a first rotating body including a shaft portion, a cylindrical portion on an outer periphery of the shaft portion, and a recessed portion in an outer surface of the cylindrical portion;

a second rotating body configured to move toward and away from the first rotating body, the second rotating body being configured to rotate while being in contact with an outer surface of the first rotating body and nipping a recording medium between the second rotating body and the first rotating body;

a transport unit including a holding portion configured to hold a front end section of the recording medium, the transport unit being configured to transport the recording medium by moving the holding portion in a rotation direction of the first rotating body while the holding portion is in the recessed portion; and a moving mechanism including a cam portion on a side surface of the cylindrical portion and a contact portion that is connected to the second rotating body and that is configured to come into contact with the cam portion to separate the second rotating body from the first rotating body before the second rotating body enters the recessed portion, wherein an attachment member including the cam portion is attached to the side surface of the cylindrical portion in a replaceable manner.

12. A transport device comprising:

a first rotating body including a shaft portion, a cylindrical portion on an outer periphery of the shaft portion, and a recessed portion in an outer surface of the cylindrical portion;

a second rotating body configured to move toward and away from the first rotating body, the second rotating body being configured to rotate while being in contact with an outer surface of the first rotating body and nipping a recording medium between the second rotating body and the first rotating body;

a transport unit including a holding portion configured to hold a front end section of the recording medium, the transport unit being configured to transport the recording medium by moving the holding portion in a rotation direction of the first rotating body while the holding portion is in the recessed portion; and a moving mechanism including a cam portion on a side surface of the cylindrical portion and a contact portion that is connected to the second rotating body and that is configured to come into contact with the cam portion to separate the second rotating body from the first rotating body before the second rotating body enters the recessed portion, wherein the cam portion is on each side surface of the cylindrical portion, and the contact portion is connected to each side of the second rotating body in an axial direction of the first rotating body.

* * * * *